UNITED STATES PATENT OFFICE.

HERBERT LEVINSTEIN AND JAMES BADDILEY, OF MANCHESTER, ENGLAND, ASSIGNORS TO COMPANY OF LEVINSTEIN LIMITED, OF MANCHESTER, ENGLAND.

AZO DYESTUFFS.

1,153,555. Specification of Letters Patent. Patented Sept. 14, 1915.

No Drawing. Application filed January 20, 1915. Serial No. 3,389.

*To all whom it may concern:*

Be it known that we, HERBERT LEVINSTEIN and JAMES BADDILEY, both subjects of the King of Great Britain and Ireland, and both residents of Manchester, in the county of Lancaster, England, have invented new and useful Improvements in Azo Dyestuffs, of which the following is a specification.

This invention consists in the production of new dyestuffs by combining the tetrazo compound of an aminoarylacidyldiamin of the general formula

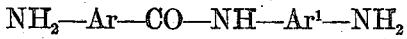

(in which Ar and Ar¹ represent aromatic residues) with, on the one hand, a molecular quantity of resorcin, and, on the other hand, a molecular quantity of an azo dye component, for example resorcin, or other suitable component.

The new dyestuffs dye cotton generally in yellow to red shades which become exceedingly fast to washing when after-treated with formaldehyde. The dyestuffs themselves are, in the form of their sodium salts, dark red to brown powders, soluble in water with usually a reddish color, and yielding as reduction products an aminoarylacidyldiamin, amino resorcin and the amino derivative of whatever other azo dye component is used.

The following are examples of how this invention may be carried into effect:

Example I: 227 parts of meta-aminobenzoyl-para-phenylenediamin are converted into the tetrazo compound by means of 138 parts of sodium nitrite and the necessary quantity of hydrochloric acid and combined with 220 parts of resorcin in a solution made alkaline with sodium carbonate. When the combination is completed the mixture is heated and the dyestuff salted out. It dyes cotton a bright orange which on aftertreating with formaldehyde becomes a little redder in shade and very fast to boiling soap and cross-dyeing.

The new dyestuff has most probably the following constitution:

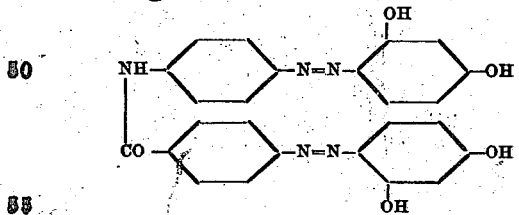

If instead of meta-aminobenzoyl-para-phenylenediamin in the above example meta-aminobenzoyl-meta-phenylenediamin is used a dyestuff is obtained which dyes a reddish yellow shade of the same high degree of fastness, while similar shades are obtained from meta-aminobenzoyl-meta-toluylenediamin and 1-methoxy-2(meta-amino-benzoyl-amino-)4-amino-benzene. Para-amino-benzoyl-para-phenylenediamin on the other hand gives a bright orange red.

Example II: 227 parts of meta-aminobenzoyl-para-phenylenediamin are converted into the tetrazo compound and combined with 202 parts of 1.2.4.5-toluylenediamin-sulfonic acid in soda alkaline solution. When the formation of the intermediate product is completed 110 parts of resorcin are added to the mixture, which is stirred and kept alkaline until combination is at an end. The dyestuff is then isolated in the usual manner. It dyes cotton in orange shades which become redder on after-treating with formaldehyde and are of good fastness to washing and cross-dyeing.

The new dyestuff is represented by the structural formula:

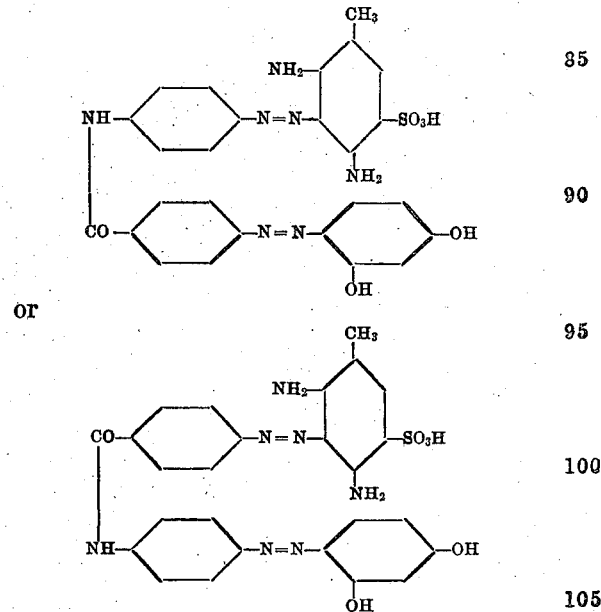

If in place of toluylenediamin-sulfonic acid in the above example 303 parts of 2.3.6-naphthylamin-disulfonic acid are used an orange dyestuff is obtained of analogous properties.

Example III: 307 parts of 1(meta-aminobenzoyl - amino)-3-amino-benzene-4-sulfonic acid are converted into the tetrazo compound by means of 138 parts of sodium nitrite and the necessary quantity of hydrochloric acid and combined with 220 parts of resorcin in a soda alkaline solution. The resulting dyestuff is salted out. It dyes cotton a yellow shade which becomes extremely fast by after-treating with formaldehyde.

The new dyestuff in the state of free acid has the constitution represented by the formula:

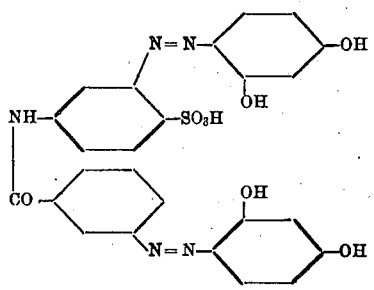

A very bright orange of similar fastness is given by using meta-aminobenzoyl-para-phenylenediamin sulfonic acid, while meta-aminobenzoyl-1.4-naphthalenediamin-6 - sulfonic acid gives a yellow-brown.

What we claim is:—

1. Azo dyestuffs obtainable by combining an amino-benzoylarylenediamin of the homologous series of which aminobenzoylphenylenediamin is the lowest member, at least one molecular proportion of resorcin and a further molecular proportion of an azo dye component of the aromatic series, which dyestuffs are in the form of their sodium salts, dark red to brown powders, soluble in water with usually a reddish color and yielding as reduction products an amino-benzoylarylenediamin, at least one molecular proportion of aminoresorcin and a further molecular proportion of the amino derivative of the additional component used; dyeing cotton generally in yellow to red shades which become exceedingly fast to washing when after treated with formaldehyde.

2. An azo dye, obtainable by combining meta - amino - benzoylparaphenylenediamin with two molecular proportions of resorcin, dyeing cotton bright orange which on treatment with formaldehyde becomes redder and very fast to boiling soap and cross-dyeing.

In witness whereof we have hereunto set our hands in the presence of two subscribing witnesses.

HERBERT LEVINSTEIN.
JAMES BADDILEY.

Witnesses:
ERNALD SIMPSON MOSELEY,
MALCOLM LONETHURST.